(12) United States Patent
Wickramasinghe et al.

(10) Patent No.: US 6,920,088 B2
(45) Date of Patent: Jul. 19, 2005

(54) ASSEMBLY FOR WRITING AND/OR ERASING HIGH DENSITY DATA ON A MEDIA

(75) Inventors: Hemantha Kumar Wickramasinghe, Chappaqua, NY (US); Hendrik F. Hamann, Mohegan Lake, NY (US); Yves Martin, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1089 days.

(21) Appl. No.: 09/774,943

(22) Filed: Jan. 31, 2001

(65) Prior Publication Data

US 2002/0101673 A1 Aug. 1, 2002

(51) Int. Cl.[7] .............................................. G11B 11/05
(52) U.S. Cl. .................... 369/13.33; 369/126; 369/47.1
(58) Field of Search .......................... 369/13.01, 13.33, 369/47.1, 13.2, 13.11, 126, 13.24, 44.23, 112.01; 360/59; 219/216, 388

(56) References Cited

U.S. PATENT DOCUMENTS

| | | | | |
|---|---|---|---|---|
| 6,069,853 A | * | 5/2000 | Novotny et al. | ......... 369/13.33 |
| 6,233,206 B1 | * | 5/2001 | Hamann et al. | ......... 369/13.01 |
| 6,304,527 B1 | * | 10/2001 | Ito et al. | .................. 369/44.23 |
| 6,433,310 B1 | * | 8/2002 | Wickramasinghe et al. | . 219/216 |
| 6,510,120 B2 | * | 1/2003 | Wickramasinghe et al. | . 369/116 |
| 6,532,125 B1 | * | 3/2003 | Hamann et al. | ............... 360/59 |
| 6,597,639 B1 | * | 7/2003 | Hamann et al. | ......... 369/13.01 |
| 6,702,186 B1 | * | 3/2004 | Hamann et al. | ............ 235/493 |
| 6,771,445 B1 | * | 8/2004 | Hamann et al. | ............... 360/59 |

\* cited by examiner

*Primary Examiner*—Ali Neyzari
(74) *Attorney, Agent, or Firm*—Stephen C. Kaufman

(57) ABSTRACT

The invention discloses an assembly capable of writing/erasing high-density data, preferably on a phase-change recording media. A preferred embodiment of the invention features a novel thermal near-field heater that may be employed in the assembly, preferably for writing in a substantially thermal near-field mode. The invention provides advantages of writing densities greater than that of diffraction limited systems, for example, writing densities of approximately greater than 100 Gbit/inch$^2$, and writing speeds approximately greater than 100 MHz.

10 Claims, 7 Drawing Sheets d<2R: NEAR-FIELD
d>2R: FAR-FIELD

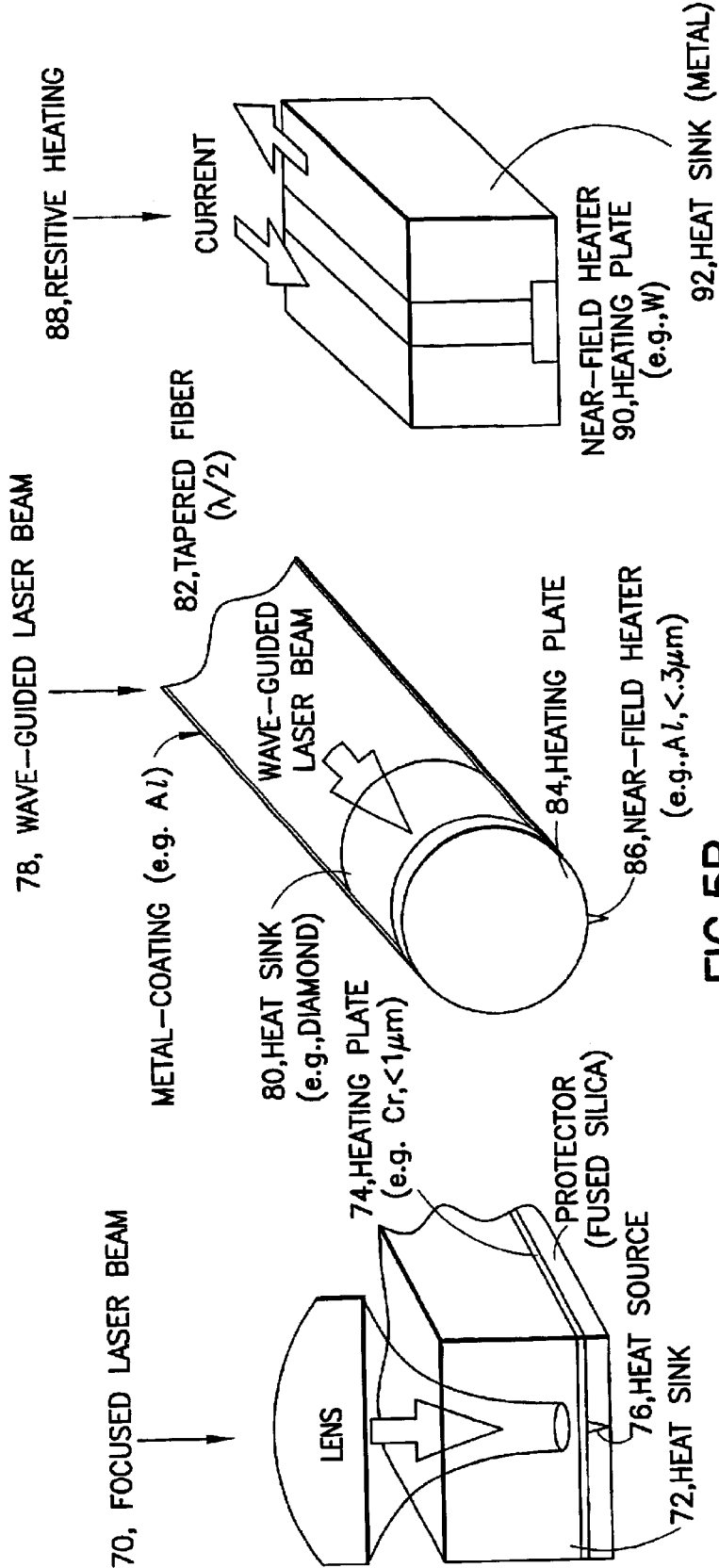

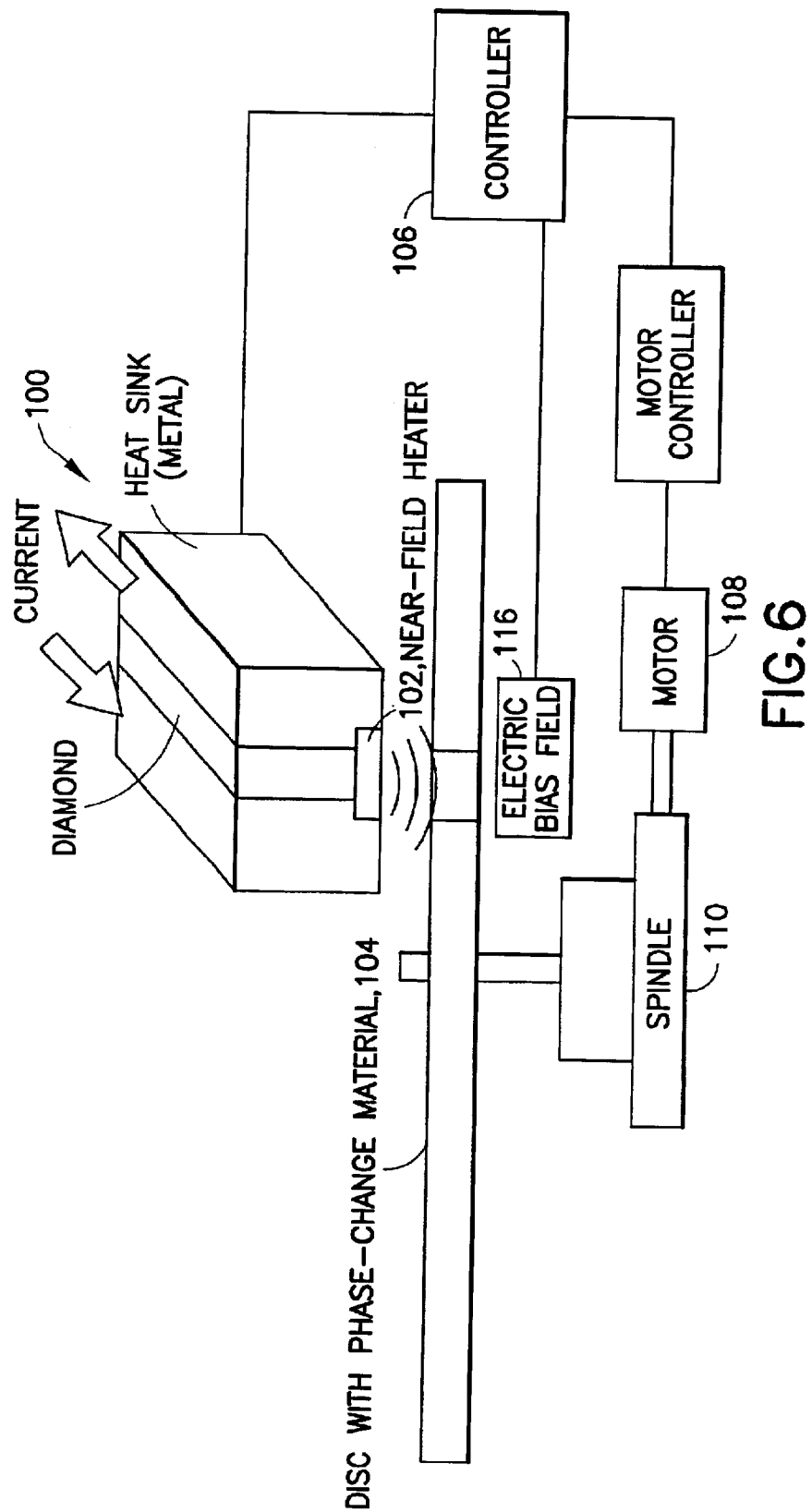

ASSEMBLY FOR WRITING AND/OR ERASING HIGH DENSITY DATA ON A MEDIA

CROSS-REFERENCE TO RELATED APPLICATIONS

The instant application is related to U.S. application Ser. No. 09/408,946, filed Sep. 30, 1999 by Wickramasinghe et al. and, to U.S. application Ser. No. 09/427,169, filed Oct. 26, 1999 by Hamann et al. and, to U.S. application Ser. No. 09/512,248, filed Feb. 24, 2000 by Hamann et al. and to U.S. application Ser. No. 09/540,726 filed Mar. 31, 2000 by Hamann et al. and, to U.S. application Ser. No. 09/559,489, filed Apr. 27, 2000 by Hamann et al. and to the following contemporaneously filed U.S. applications, namely, Ser. No. 09/774,851, filed Jan. 31, 2001 by Wickramasinghe et al. and, to U.S. application Ser. No. 09/773,323, filed Jan. 31, 2001 by Wickramasinghe et al. and, to U.S. application Ser. No. 09/773,346, filed Jan. 31, 2001 by Wickramasinghe et al. All of these applications are co-pending, commonly assigned, and incorporated by reference herein.

FIELD OF THE INVENTION

This invention relates to a novel assembly suitable for writing and/or erasing high density data on a media.

INTRODUCTION TO THE INVENTION

The instant invention builds upon concepts and assemblies disclosed in the cross-referenced applications. In particular, we reference IBM docket YOR920010056, which discloses a novel assembly suitable for reading data based on thermal coupling between the novel assembly and a storage media. To this end, the novel reading assembly in one embodiment recites:

1) a head-like structure;
2) a temperature sensor supported by the head-like structure, the temperature sensor capable of monitoring thermal coupling between the sensor and a media;
3) a heater element for heating the temperature sensor; and
4) a controller for coordinating a mutual positioning of the head-like structure and a media.

This novel reading assembly has the important advantages of providing capabilities of reading information on a storage media at high speed and at a resolution which can qualitatively and profoundly transcend the delimitation of defraction limited focused laser beam technologies. For example, this novel reading assembly can provide capabilities for reading information on a storage media, e.g., a phase-change media at high speed (e.g., greater than 0.01 MHz, illustratively 100 MHz) and, at a resolution such that there are storage densities larger than 1 Gbit/in$^2$.

SUMMARY OF THE INVENTION

The present invention complements the novel reading assembly disclosed in the aforementioned YOR920010056, by disclosing a novel assembly for writing and/or erasing high-density data on a media, the present invention complementing the novel reading assembly in the sense that it can provide the qualitative advantages and inherent capabilities of speed, resolution, and storage densities realizable in the novel reading assembly.

To this end, accordingly, we disclose an assembly for writing and/or erasing high-density data on a media as a series of tags comprising an information bit pattern, the assembly comprising:

1) a thermal heater for generating and directing an incident thermal wave to a media; and
2) a position controller for coordinating a mutual positioning of an incident thermal wave and the media for inducing a direct thermal coupling therebetween;

the assembly acting as a writer and/or eraser by operating the position controller so that writing and/or erasing can be enabled by using an information signal for modulating a localized thermal wave generated in the vicinity of a media.

BRIEF DESCRIPTION OF THE DRAWING

The invention is illustrated in the accompanying drawing (not drawn to scale), in which:

FIGS. 5A–C show illustrative embodiments of mechanisms for depositing thermal energy to the invention's thermal heater; and FIG. 6 shows a more specific assembly for writing and/or erasing data on a phase-change media with a spinning disc.

DETAILED DESCRIPTION OF THE INVENTION

Overview of Assembly

Figure 1:
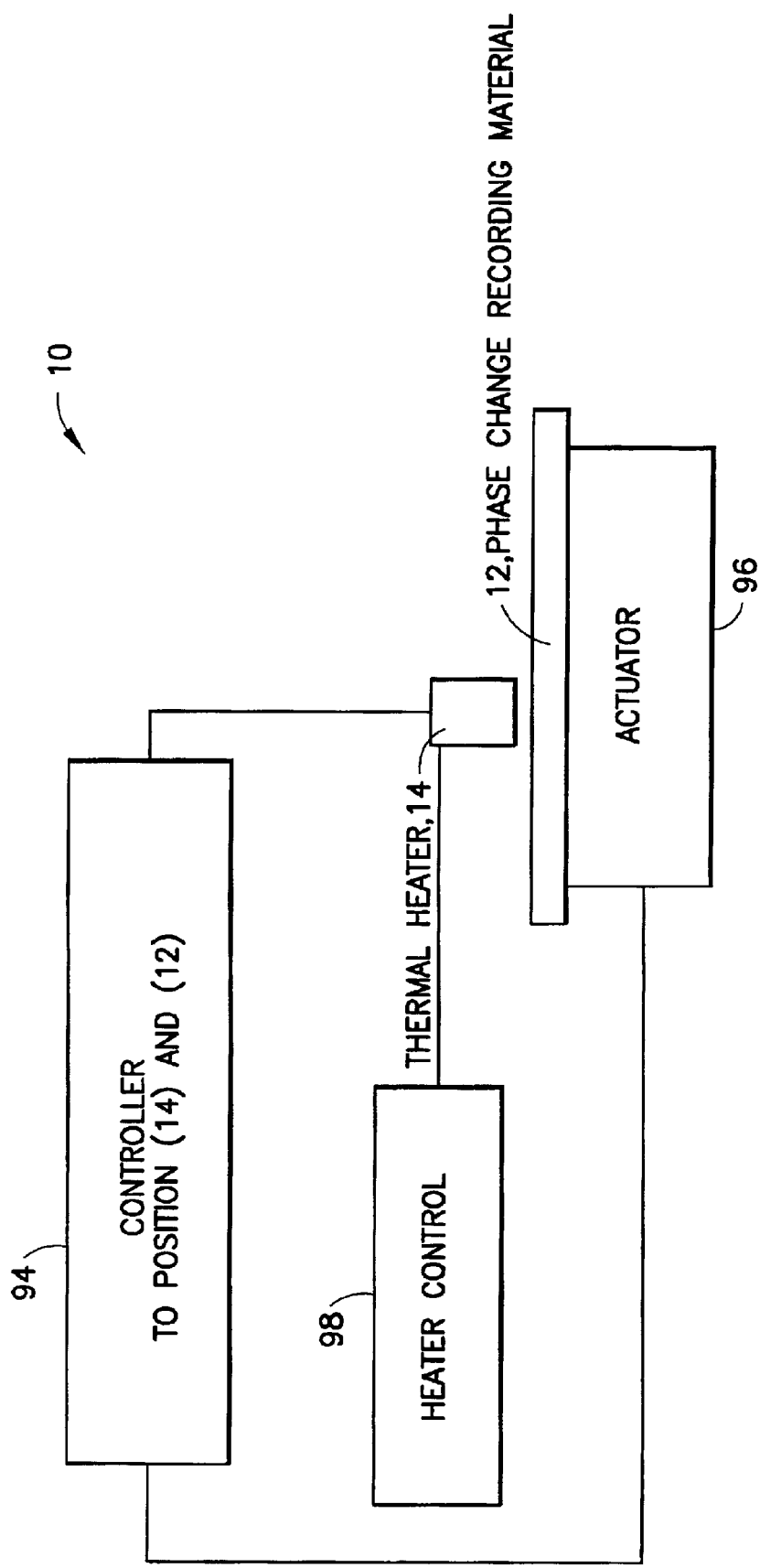
FIG. 1 shows a generalized assembly for writing and/or erasing data on an illustrative phase-change media, that generalized assembly capable of being built in accordance with principles of the present invention.

FIG. 1 shows a generalized assembly (10) constructed in accordance with the invention as summarized above. In overview, the FIG. 1 assembly (10) can function to write and/or erase high density data, illustratively, and preferably, on a phase-change recording media (12), for example, a media (12) comprising binary (e.g., GaSb, InSb, InSe, $Sb_2Te_3$, GeTe), ternay ($Ge_2Sb_2Te_5$, InSbTe, GaSeTe, $SnSb_2Te_4$, InSbGe) and quaternary (AgInSbTe, (GeSn)SbTe, GeSb(SeTe), $Te_8Ge_{15}Sb_2S_2$) chalcogenide alloys. We note that the illustrative phase-change recording media can be part of a more complicated multilayer structure which accommodates the different requirements for reading/erasing and writing the data. The thickness of the recording media and the surrounding layers are preferably designed to optimize the read signal contrast and signal to noise ratio, enhance cyclability, and minimize the laser power necessary to write and/or erase the recording layer.

Thermal Heater

The FIG. 1 assembly (10) requires a thermal heater (14) for generating and directing an incident thermal wave to the media (12). As an example, the assembly (10) may implement a thermal near-field heater in the form of an atomic force microscope probe (AFM), utilizing an AFM's cantilever as a heating plate and heat sink.

Near-Field Thermal Heater

A suitable near-field thermal heater may comprise two elements: a heating plate that can operate as a heat source; and, a heat sink attached to the heating plate; the heater capable of developing a thermal near-field coupling with the phase change media (12).

Attention is now directed to FIGS. 2A–D, which help illustrate the many different geometrical, dimensional, and material configurations which may be suitably adapted for a particular realization of a novel thermal near-field heater.

In overview of the FIGS. 2A–D thermal near-field heaters, it is noted that their purpose is to deposit heat energy to the phase-change recording media (12). This energy can be almost any kind; e.g., coherent or non-coherent excitons, plasmons, phonons, photons, etc., and it can be delivered in any mode, e.g., as convective, radiative, conductive, diffusive or ballistic transfer. For example, it can be delivered in any mode from the heat source to the media (12). The heat transfer (e.g., see J. B. Xu, K. Läuger, R. Möller, K Dransfeld, I. H. Wilsom, J. Appl. Phys. 76, 7209 (1994)) is generally diffusive, if the mean free path of the gas molecules $\Lambda$ is much less than the distance of the heater to media d. However, if the d<$\Lambda$ the molecules in the junction go from the heater to the media without collisions, and transfer the heat in a ballistic manner. In the ballistic regime the transferred power is independent of the distance between media and heater and proportional to the gas pressure. In order to optimize the heat transfer between heater and recording media it may be preferred to increase the gas pressure and/or using gas molecules with a small molecular or atomic mass (e.g. He, $H_2$). In addition, in the far-field heat can be transferred via propagating radiation according to the Stefan-Boltzmann law. Furthermore, non-propagating waves (near-field) are capable of transferring the heat via a tunneling process when heater and media are very close to each other (near-field region). From a physics point of view, the charges within the near-field heater are thermally excited, which generate a significant driving field of the thermal heater. This driving field generates a near-field of the heater, which couples to the phase-change media (12), and thus heats it up. It is noted that this effect can be maximized by using a resistive conductor (e.g., carbon). In addition, this effect may be enhanced by implementing an elongated shape as well as a very small end radius of the heater.

Good geometrical conductors for our thermal near-field heater may include rectangular or cylindrical design, of the type shown in FIGS. 2, A, B, respectively (numerals 16–26).

For example, the preferred dimensions of $y_1$ and $z_1$ (FIG. 2A) or $r_1$ (FIG. 2B) are informed by the way the thermal energy is to be deposited. For instance, if one uses a focused laser beam to heat up the heating plates (18,24), $y_1$ and $z_1$ or $r_1$ preferably are larger than the waist of the laser focus (e.g., for a numerical aperture of 0.8 at a wavelength of $\lambda=1$ μm $y_1$, $z_1$, $r_1$>0.4 μm). If, on the other hand, one uses a wave-guided laser beam, then the heating plate (18,24) preferably is attached right onto the end of a fiber (e.g., via a deposition technique). Therefore, the heating plate (24) preferably has a cylindrical shape, and $r_1$ is determined by the wave-guide size. More specifically, for a single mode fiber in the visible wavelength range, $r_1$ preferably is approximately 3–4 μm. If one uses tapered fiber, $r_1$ preferably is larger than or equal $\approx\lambda/2$, where $\lambda$ is the wavelength of the utilized laser light. If, alternatively, one uses resistive heating, then one chooses, most likely, a rectangular shape, and the dimensions are preferably dominated by the connections and the preferred resistance.

In the case of resistive heating, these dimensions can be rather small ($y_1$, $z_1$<0.1 μm) if they are made via e-beam lithography. We note that in the case of resistive heating, the dimensions as well as the material determine the actual resistance, and hence the heating.

While the $y_1$, $z_1$, $r_1$ dimensions are determined mostly by practical needs, the thickness of the heating plate (18,24) itself should be rather small ($d_1$, $x_1$<0.5 μm), for example, if the device is to be used for high speed recording. More specifically, in high speed applications, one preferably uses energy pulses to deposit the heat in the heating plate, so as to subsequently heat up the near-field heat source, e.g., a tip or an edge of the heating plate.

In order to heat up again, the deposited heat (from a last pulse), has to be dissipated. This dissipation is governed by the thermal diffusion length $l=(\kappa\cdot\tau)^{0.5}$, where $\kappa$ is the thermal diffusivity and $\tau$ is the time after the arrival of a heat pulse. Specifically, the heat in a good thermal conductor (approximately $\kappa=2\cdot 10^{-5} m^2 s^{-1}$) can diffuse a distance of 0.45 μm in only 10 ns, corresponding to recording rates of 100 MHz. If one uses a laser beam to deposit the heat, it is noted that the heating plate (18,24) preferably should be at least of the thickness of the skin depth at the laser frequency. Specifically, for a very high absorbing material (e.g., Al) it preferably is larger than 10 nm at 633 nm.

The heating plate (18,24) can be made out of any material, but in general the following requirements preferably exist. (1) The material preferably has a high melting point (T>1100K), generally higher than the temperature, which is necessary for the recording. (2) The material preferably is chemically stable at the operating temperatures. (3) It preferably has a high thermal diffusivity ($\kappa>1\cdot 10^{-5} m^2 s^{-1}$, e.g., metals and alloys). (4) The material preferably is high absorbing if a laser is used for the heating (e.g., Cr, Al). (5) If the heating plate operates as the heat source, a resistive conductor may be preferred, especially in order to maximize the heat transfer from the heater to the phase-change material via near-field coupling.

Figure 2A:
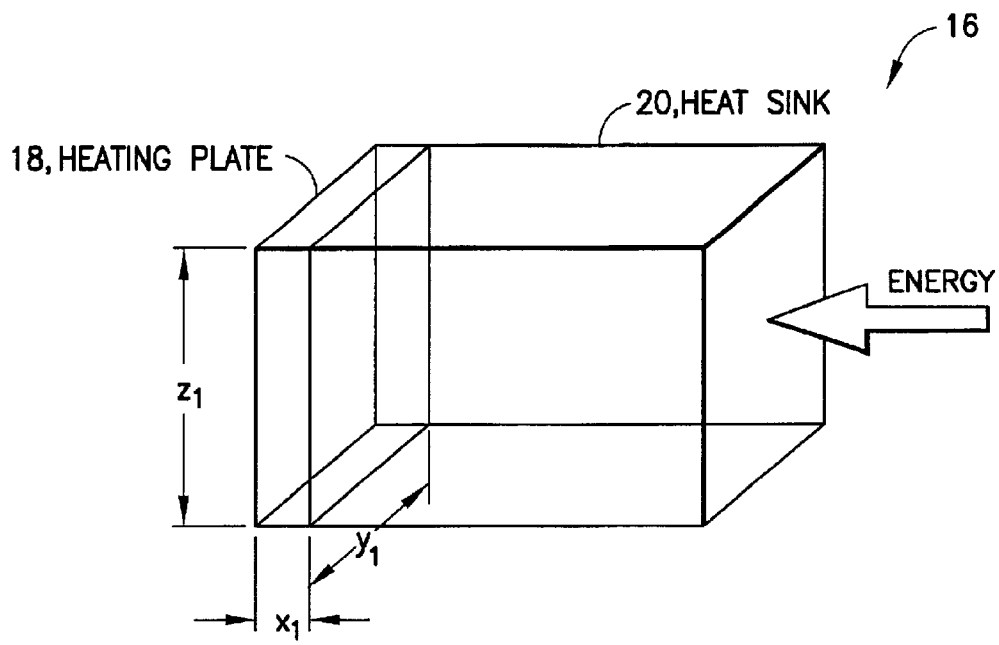
FIGS. 2A–D show alternative embodiments of a near-field thermal heater with emphasis on its heating plate which can act as a heat source, that may be employed in the FIG. 1 assembly.
Figure 2B:
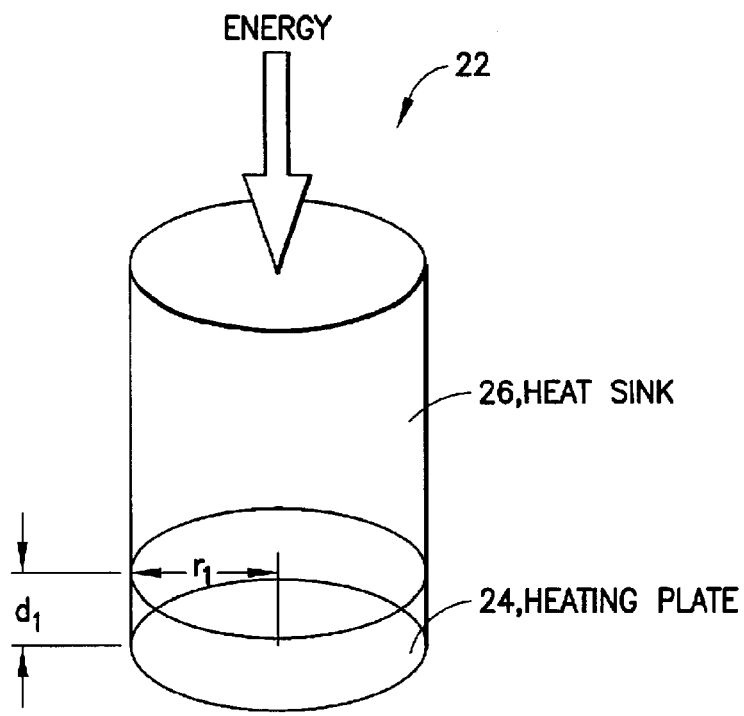
Figure 2C:
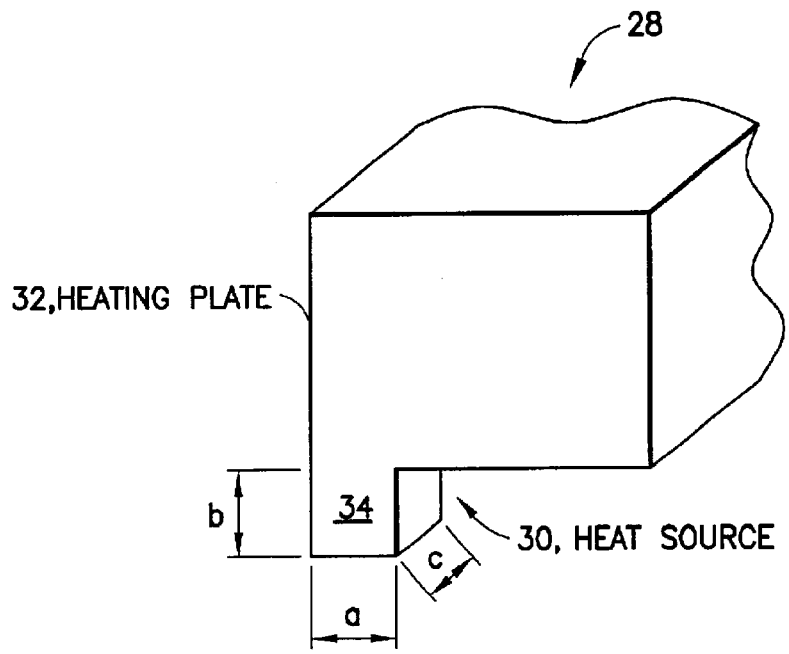
Figure 2D:
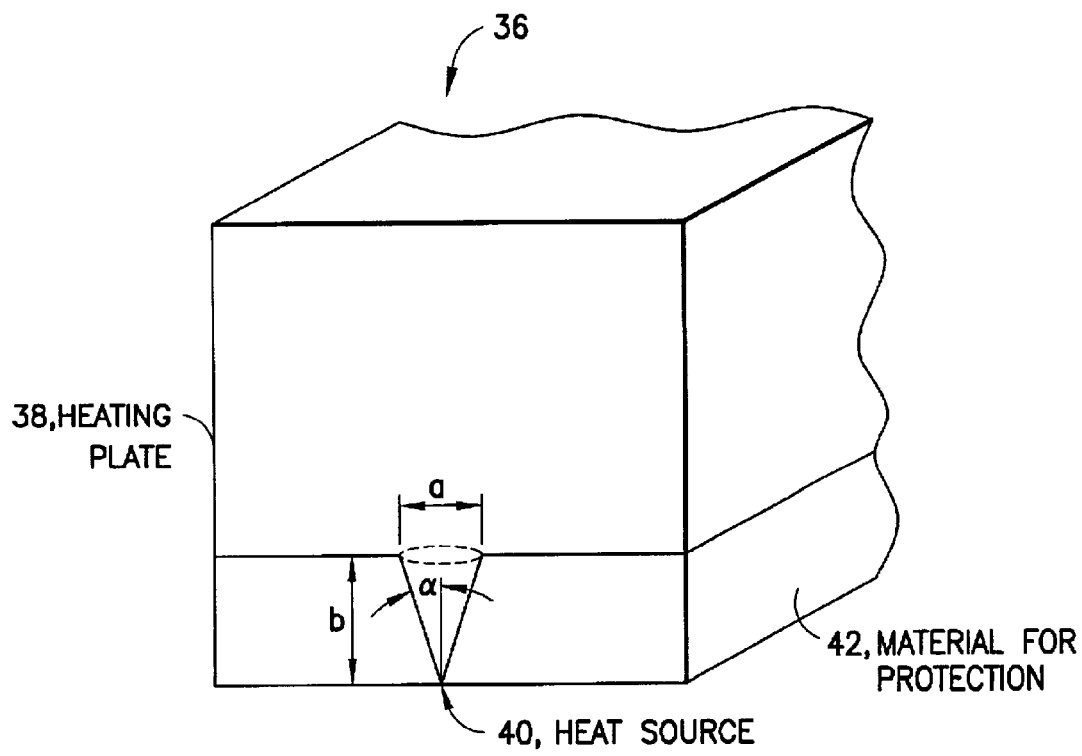

As explained above, a generic purpose of the heat plate operating as a heat source is to guide the thermal energy to (an illustrative) phase-change media (12). It should be noted that the heating plate is generally hot, and hence generally capable of heating the media. However, such general heating may not always be optimal, since the dimensions of the heating plate may be large, resulting in a large bit. One purpose of the heat source, accordingly, may be to avoid general heating from the heating plate, and to instead focus the thermal energy to a very small point. An attendant and novel property is then to generate a thermal near-field, which can interact very locally, preferably on a nanometer scale, with the media. To this end, the heating plate operating as a heat source can have all kinds of shapes and dimensions. For example, the heat source may be just an edge (34) of a heating plate (32) (FIG. 2C), or a truncated cone (40) of a heating plate (38) (FIG. 2D). Sometimes, the heat source may be usefully protected by some low heat conducting material (42) (e.g., glass).

Overall, the shape and dimensions of the heating plate operating as a heat source are influenced by the following requirements. (1) For high speed application, a designer preferably chooses shape and dimensions which transfer the heat as fast as possible. In general, that means that a heat source preferably should have a small length b (e.g., b<0.5 μm), in order to achieve sufficient heat dissipation considering possible reading/erasing rates as high as 100 MHz. If one just considers high speed applications, one may be tempted to choose large dimensions of a, c (FIG. 2C) and a, α (FIG. 2D) in order to avoid a slow one-dimensional heat conduction. (2) However, besides high speed, a heat source preferably provides a very local heating, avoiding any stray heat from the heating plate, generally, Accordingly, this correlates with opposite requirements for the dimensions.

For a very local heating, preferably choose b large (>0.1 μm), and the dimensions a, c small (<0.01 μm) (FIG. 2C) as well as a small a and α (a<0.1 μm, α<15°, FIG. 2D). We note increasing power loss with decreasing dimensions in a, c (FIG. 2C) and a,α (FIG. 2D), which may result in insufficient and very ineffective heating. (3) The shape and dimensions of the heat source are preferably matched to a bit size and a bit pattern. In general, the bits are typically larger or equal to the dimensions of a heat source. Specifically, for a 20 nm bit, preferably work with a heat source of the dimensions a, c<<20 nm (FIG. 2C). (4) Finally, in order to maximize the thermal near-field coupling (as outlined above), an elongated shape with a sharp tip-like point may be preferred.

The material of the heating plate can be almost any kind. We note that an edge or tip material is preferably governed by the same general material requirements as that of the heating plate, proper.

We recall from above that our preferred thermal near-field heater includes a second element, namely, a heat sink attached to the heating plate. We now turn our particular attention to this second element.

Figure 3A:
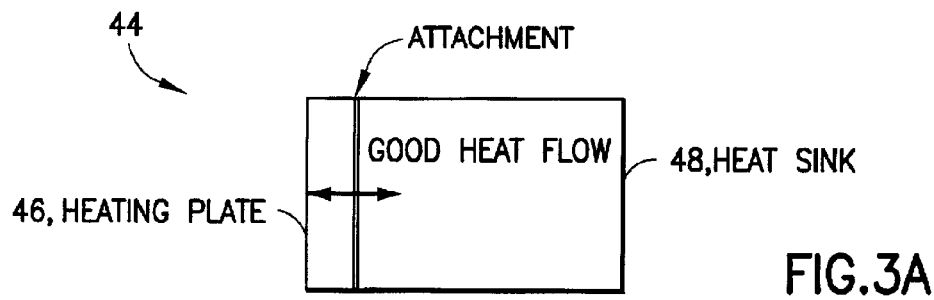
FIGS. 3A–C show alternative embodiments of the FIG. 2 near-field thermal heater, with emphasis on its heat sink.

An important purpose of the heat sink is to dissipate deposited heat as fast as possible, in order to get ready for a new heating pulse. Therefore, the heat sink is preferably attached to the heating plate (FIG. 3A, numerals 44–48). This attachment preferably is made in such a way that the heat diffusion and conduction between heat sink and heating plate is as good as possible (>20 W/mK, >$10^{-5} m^2 s^{-1}$). Therefore, it may be very advantageous if the heat sink and the heating plate are made out of the same piece of material. In other cases, the heat sink may be welded, glued, or deposited (via e-beam, vapor, sputtering etc.) right on the heating plate.

Figure 3B:
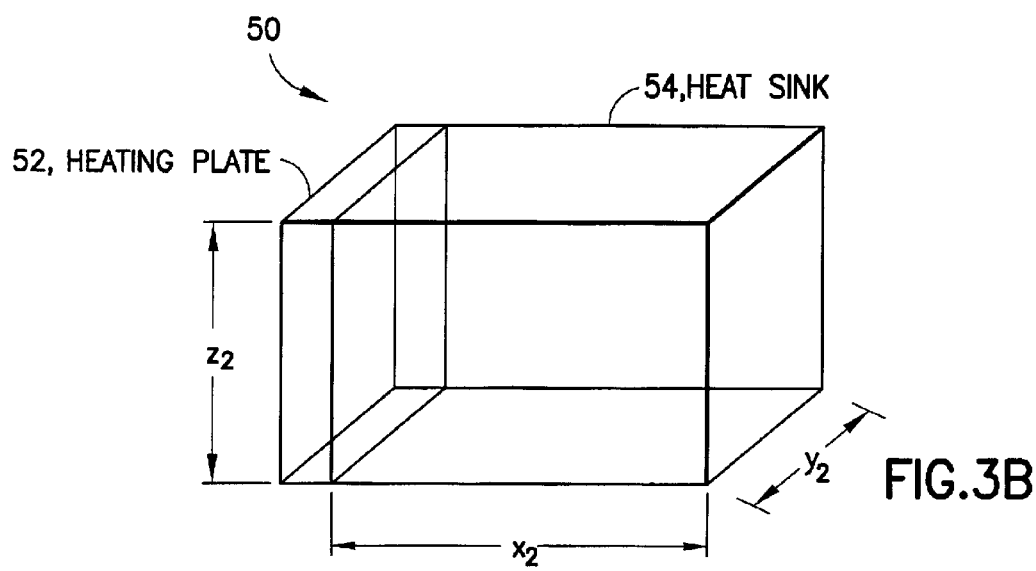
Figure 3C:
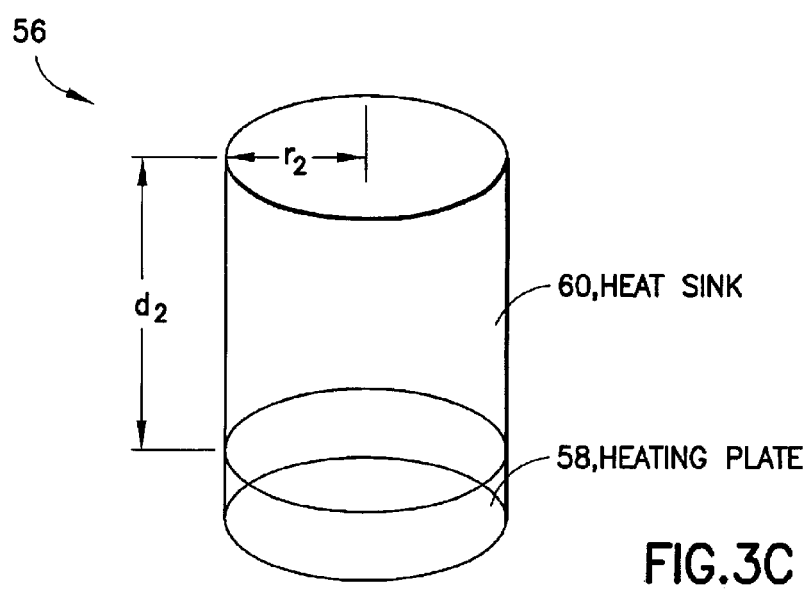

Dimensions and shape for the heat sink are not very critical, so that only guidelines can be given here. In general, the heat sink can have all kinds of shapes. However, in typical cases, it may be rectangular or cylindrical (see FIGS. 3B, C, numerals 50–60). To provide a sufficient heat sink mass, the heat sink preferably is as large as possible. Large dimensions (>1 μm) of $y_2$, $z_2$ and $r_2$ may result in a three-dimensional heat flow greatly enhancing the speed for heat dissipation. The dimensions and the shape of the heat sink do not have to necessarily match the dimensions of the attached heating plate. However, in general the heat sink preferably has dimensions larger or equal to the heating plate (e.g., $y_2 \geq y_1$, $z_2 \geq z_1$, $r_2 \geq r_1$). In terms of the thickness of the heat sink, we note that $d_2$ and $x_2$ should preferably be at least the thermal diffusion length l for a given heating repetition rate 1/t. The material of the heat source can be almost any kind. In analogy to the heating plate and the heat tip or edge, the material of the heat sink preferably has a high melting point as well as a high heat conductivity and diffusitivity. However, in some cases the material should not be high absorbing at the laser wavelength, if the laser has to be focused on the heating plate through the heat sink material. In such case, preferably use a transparent material, which is still a good heat conductor and has a high melting point (e.g., diamond).

The Thermal Near-Field

It is asserted above that the invention advantageously uses the idea of direct thermal coupling between a heater and a phase-change media, and, that this coupling can subsume far-field and/or near-field effects. In particular, near-field effects may include a continuum that may extend from coupling that subsumes at least one portion of the thermal near-field; ranging e.g., from partially inclusive, to substantially or even complete coupling in the thermal near-field. We now provide a working definition, for the purposes of a utility of this invention, of the thermal near-field, a utility of the invention generally captured in the notion that increased storage and speed generally correlate to operating more extensively in the thermal near-field.

Figure 4:
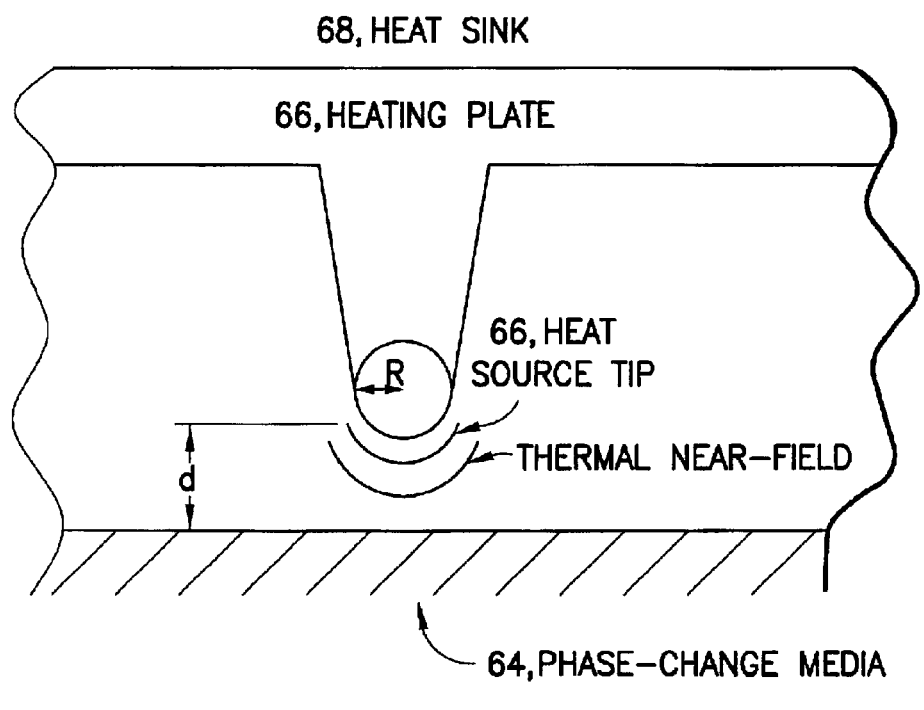
FIG. 4 provides a schematic useful for developing the notion of a near and far-field, as this concept relates to the present invention.

The concept of the thermal near-field is now explained, using an illustrative FIG. 4. Here, a heat source tip (62) interacts via its thermal near-field with a phase-change media (64). For discussion purpose, the FIG. 4 heat source tip (62) is spherical at its end with a radius R. For purposes of this invention, the thermal near-field region is the area generally within approximately 2 R away from the heat source tip (62). The rest of the area is generally called far-field. We note that in the near-field region, the extent of the thermal energy is generally governed by the heat source tip dimensions. Therefore, if the heat source tip is brought within approximately 2 R to the phase-change media (68), very local, nanoscale heating of the media can be achieved. A heated area is then determined by the heat source dimensions, rather than the energy or wavelength, which is a basic idea of this aspect of the invention.

In this particular application of heat flow, in the far-field the heat is transferred via diffusion as well as via radiation according to the Stefan-Boltzmann law. In the near-field, a ballistic heat flow, where a gas molecule picks up some energy form the heater and transfers it without collisions to the media, as well as heat conduction via non-propagating waves, are important. We also note that contamination layers on the surface may contribute significant heat flow via conventional heat conduction as well as intermittent contact between heater and phase-change material.

Heat Supply Systems

There are different ways of supplying the thermal energy; examples are illustrated in FIGS. 5A, B, C.

FIG. 5A shows a focused laser beam embodiment (70), wherein laser light is brought through a heat sink (72) onto a heating plate (74). In this case, we prefer the use of diamond as a heat sink material, which is transparent and has an excellent heat conductivity. An alternative material could be Si, if an infrared laser is used. The heating plate (74) can be very thin (0.1 μm) if a high absorbing material is used (e.g., Al, Cr.). Directly attached to the heating plate (74) is a heat tip or feature (76), which preferably is short (<0.3 μm). The material of the heat tip or feature (76) can be Cr as well or Al. In these cases, the heat tip or feature preferably is protected with a low heat conducting material, such as glass. Simple estimations about the heat flow suggest that such a device can record and/or erase data with>100 MHz.

FIG. 5B shows an alternative embodiment comprising a wave-guide laser beam (78) used for the heating. In this embodiment, a heat sink (80), which preferably is made out of diamond, may be directly attached to the end of a fiber (82). In other cases, a metal-coating (e.g., Al) of the wave-guide can be used as the heat sink. The wave-guide laser beam is absorbed by a thin (<0.1 μm) heating plate (84) directly attached to the fiber or heat sink. Again as a material, Cr or Al may be advantageous, which have generally a small skin depth (<0.02 μm). A heat source or tip (86) can be an edge or a little probe attached to the heating plate (84). In such a design, the heat source or tip exemplary has a length<0.3 μm.

FIG. 5C shows a further alternative embodiment wherein resistive heating (88) may be used to heat up a heating plate (90). As a heat sink (92), the transmission lines could be used, which may be out of a metal such as Cu. The two transmission lines are separated by a non-conducting material, for example, diamond or even quartz glass. Diamond has an advantage, in that it is a very good heat conductor, and can assist the heat sink (92). The two transmission lines are connected via the heating plate (90), which can act as a heating source. The heating plate (90) can be very small, e.g., (<0.05 μm). As a material for the heating plate and the heat source, tungsten or carbon may be very suitable, because of its high resistance and melting point.

Thermal Heater Comprising An AFM Probe

As asserted above, the FIG. 1 assembly (10) contemplates that the thermal heater (14) may comprise an atomic force microscope probe (AFM). AFM's are generally discussed in U.S. Pat. No. 4,343,993, incorporated by reference herein. For our purposes, the AFM's cantilever can function as heating plate and heat sink. Thus, a laser focused onto the cantilever (heating plate) can be used to heat up the probe. Also, resistive heating with an AFM probe can be used.

Controller

The FIG. 1 assembly (10) includes a controller (94) for coordinating a mutual positioning of the incident thermal wave generated by (14) and the media (12) for inducing a direct thermal coupling therebetween. Preferably, this controller (94) functions so that the coupling subsumes at least one portion of the thermal near-field. A suitable such controller preferably uses an actuator (96), which actuator (96) may be selected from the group consisting of a piezo-electric actuator, an electrostatic actuator, an electromagnetic actuator, a magnetic-strictive actuator, and a thermal-mechanical actuator.

The FIG. 1 assembly (10) includes a controller (98) for enabling thermal heater control. The thermal heating can be controlled by modulating a laser (e.g., liquid crystal, Bragg cell, current modulation etc.) if a laser is used, or by simply modulating the supplied current if resistive heating is implemented or by modulating the distance between the thermal heater (14) and the phase-change media (12). The controller (98) has to be able to realize at least three different power levels: A first one for turning the heater off and for disabling the writing/erasing process, a second one for enabling the writing process, and a third one for enabling the erasing process.

A Specific Assembly for Writing and/or Erasing Data

FIG. 6 shows an assembly (numerals 100–110) that may be built in fulfillment of this idea. The assembly (100) includes a source of thermal radiation (102) for directing a incident thermal wave to a disc comprising a phase-change material (104). The thermal radiation of (102) can be modulated for writing and/or erasing by a controller (106) by adjusting the current. A controller (106)—motor (108)—spindle (110) assembly may be employed for coordinating a mutual positioning of the incident thermal wave and the phase-change material (104), for inducing a direct near-field or far-field thermal coupling, therebetween. Operation of the FIG. 6 assembly (100) may be effected in accordance with methodology summarized above; namely, writing/erasing high-density data by using an information signal for modulating the power of the incident thermal wave to the phase-change media (104).

What is claimed:

1. An assembly for writing and/or erasing high-density data on a recording media as a series of tags comprising an information bit pattern, the assembly comprising:
    1) a thermal heater for generating and directing an incident thermal wave to a media; and
    2) a position controller for coordinating a mutual positioning of the incident thermal wave and a media for inducing a direct thermal coupling therebetween;
the assembly acting as a writer/and or eraser by operating the position controller so that writing and/or erasing can be enabled by using an information signal for modulating a localized thermal wave generated in the vicinity of a media.

2. An assembly according to claim 1, wherein the thermal heater comprises:
    1) a heating plate that can operate as a heat source; and
    2) a heat sink attached to the heating plate;
    the heater capable of developing a thermal near-field coupling with the media.

3. An assembly according to claim 2, wherein the heating plate comprises a tip that can operate as the heat source.

4. An assembly according to claim 2, wherein the heating plate defines a dedicated edge that can operate as the heat source.

5. An assembly according to claim 2, further comprising a focused laser beam thermally coupled to the heat sink.

6. An assembly according to claim 2, further comprising a wave-guided laser beam thermally coupled to the heat sink.

7. An assembly according to claim 2, further comprising a resistive heating unit thermally coupled to the heat sink.

8. An assembly according to claim 1, wherein the thermal heater comprises an atomic force microscope probe.

9. An assembly according to claim 1, wherein the position controller coordinates the mutual positioning of the incident thermal wave and a media for inducing a direct thermal coupling therebetween that subsumes at least one portion of a thermal near-field.

10. An assembly according to claim 1, wherein the thermal coupling subsumes at least one of ballistic, diffusive, conductive, and convective heat transfer.

* * * * *